(12) United States Patent
Pöyhönen (10) Patent No.: US 8,989,737 B2
(45) Date of Patent: Mar. 24, 2015

(54) SYSTEM AND METHOD FOR ESTABLISHING A SESSION INITIATION PROTOCOL COMMUNICATION SESSION WITH A MOBILE TERMINAL

(75) Inventor: Petteri Pöyhönen, Helsinki (FI)

(73) Assignee: Nokia Corporation, Espoo (FI)

( * ) Notice: Subject to any disclaimer, the term of this patent is extended or adjusted under 35 U.S.C. 154(b) by 2151 days.

(21) Appl. No.: 10/797,765

(22) Filed: Mar. 10, 2004

(65) Prior Publication Data

US 2005/0201357 A1 Sep. 15, 2005

(51) Int. Cl.
*H04W 4/00* (2009.01)
*H04L 12/66* (2006.01)
(Continued)

(52) U.S. Cl.
CPC .............. *H04L 12/66* (2013.01); *H04L 29/125* (2013.01); *H04L 29/12537* (2013.01); *H04L 29/12896* (2013.01); *H04L 61/106* (2013.01); *H04L 61/2564* (2013.01); *H04L 61/2578* (2013.01); *H04L 61/605* (2013.01); *H04W 76/022* (2013.01); *H04L 65/1006* (2013.01); *H04L 65/105* (2013.01); *H04L 65/1069* (2013.01);
(Continued)

(58) Field of Classification Search
CPC ........ H04W 8/04; H04W 60/00; H04W 60/06
USPC ............... 370/338, 352; 455/445, 435.1, 400, 455/466, 550.1, 575.1; 709/316, 229, 225, 709/227; 713/155, 201, 152
See application file for complete search history.

(56) References Cited

U.S. PATENT DOCUMENTS 6,618,757 B1 9/2003 Babbitt et al.
6,636,491 B1 10/2003 Kari et al.
(Continued)

FOREIGN PATENT DOCUMENTS

JP 62-248339 A 10/1987
JP 8-18571 A 1/1996
(Continued)

OTHER PUBLICATIONS

J Rosenberg, H. Schulzrinne, G. Camarillo, A. Johnston, J. Peterson, R. Sparks, M. Handley, E. Schooler; *SIP: Session Initiation Protocol*; Jun. 2002; 202 pp.; RFC 3261: The Internet Society (2002).
(Continued)

*Primary Examiner* — Amancio Gonzalez
(74) *Attorney, Agent, or Firm* — Alston & Bird LLP (57) ABSTRACT

A system is provided for establishing a communication session with a terminal (i.e., terminating SIP client). The system includes a network node (e.g., SIP proxy) located in a network across which an originating client is capable of communicating. The network node is capable of sending a trigger to the terminal independent of the network. The network node is also capable of receiving a registration message, in response to the trigger, from the terminal across the network. In this regard, the network node is capable of receiving the registration message to thereby identify the terminal across the network such that a communication session is capable of being established with the terminal based upon the identity of the terminal across the network.

54 Claims, 4 Drawing Sheets

(51) Int. Cl.
*H04L 29/12* (2006.01)
*H04W 76/02* (2009.01)
*H04L 29/06* (2006.01)
*H04W 60/00* (2009.01)
*H04W 88/18* (2009.01)

(52) U.S. Cl.
CPC ........... *H04L 65/1073* (2013.01); *H04L 63/029* (2013.01); *H04W 60/00* (2013.01); *H04W 88/182* (2013.01)
USPC ........ 455/435.1; 455/400; 455/445; 455/466; 455/550.1; 455/575.1; 370/338; 370/352; 709/227

(56) References Cited

U.S. PATENT DOCUMENTS

| | | | |
|---|---|---|---|
| 6,690,407 | B1 | 2/2004 | Parker et al. |
| 6,751,677 | B1* | 6/2004 | Ilnicki et al. ................. 719/316 |
| 6,910,074 | B1 | 6/2005 | Amin et al. |
| 7,072,332 | B2 | 7/2006 | D'Souza |
| 7,177,636 | B2* | 2/2007 | Oda et al. ................... 455/426.1 |
| 2001/0005675 | A1 | 6/2001 | Aho |
| 2001/0034767 | A1 | 10/2001 | Aho |
| 2002/0058504 | A1* | 5/2002 | Stanforth ...................... 455/426 |
| 2002/0064164 | A1* | 5/2002 | Barany et al. ................. 370/401 |
| 2002/0126701 | A1 | 9/2002 | Requena |
| 2002/0138622 | A1 | 9/2002 | Dorenbosch et al. |
| 2002/0196782 | A1 | 12/2002 | Furukawa et al. |
| 2003/0058874 | A1 | 3/2003 | Sahaya et al. |
| 2003/0112793 | A1 | 6/2003 | Sengodan |
| 2003/0154293 | A1* | 8/2003 | Zmolek ......................... 709/228 |
| 2003/0206536 | A1 | 11/2003 | Maggeti |
| 2004/0003058 | A1 | 1/2004 | Trossen |
| 2004/0005886 | A1* | 1/2004 | Oda et al. ................... 455/422.1 |
| 2004/0024879 | A1* | 2/2004 | Dingman et al. ............. 709/227 |
| 2004/0044777 | A1 | 3/2004 | Alkhatib et al. |
| 2004/0156380 | A1* | 8/2004 | Silverman et al. ............ 370/428 |
| 2005/0210292 | A1* | 9/2005 | Adams et al. ................. 713/201 |
| 2006/0025141 | A1* | 2/2006 | Marsh et al. ................. 455/445 |

FOREIGN PATENT DOCUMENTS

| | | |
|---|---|---|
| JP | 2003179603 (A) | 6/2003 |
| WO | WO 02/09387 A1 | 1/2002 |
| WO | WO 03/088625 A1 | 10/2003 |

OTHER PUBLICATIONS

P. Sfusuresh; *Traditional IP Network Address Translator (Traditional NAT)*; Jan. 2001; 15 pages; REC 3022; The Internet Society (2001); available at <http://www.ietf.org/rfc/rfc3022.txt?number=3022> (visited Nov. 20, 2003).

Matt Smith, Ray Hunt; *Network Security using NAT and NAPT*, 2002; 16 pages.

*Network Initiated Data Session (NIDS)—Stage I Requirements*; 2003; 10 pages; 3GPP2.P0090-0, Version 0.2; S10-20030512-008; San Diego, California.

Suzuki, "Study on Mobile IP Applied Network Services for Enterprise User", *IEICE Technical Report*, vol. 102, No. 692, pp. 315-318, Feb. 28, 2003.

Kuroki, "A Study on Control Method of a Firewall Function in SIP Application Level Gateway (SIP-ALG)", *IEICE Technical Report*, vol. 102, No. 691, pp. 105-108, Feb. 27, 2003.

Japanese Office Action for Application No. 2007-502432.

Second Office Action in Chinese Application No. 200580012908.3 dated Apr. 26, 2010.

Notification of Reasons for Refusal in Japanese Application No. 2007-502432 dated May 10, 2010.

\* cited by examiner

SYSTEM AND METHOD FOR ESTABLISHING A SESSION INITIATION PROTOCOL COMMUNICATION SESSION WITH A MOBILE TERMINAL

FIELD OF THE INVENTION

The present invention generally relates to systems and methods for establishing a communication session in accordance with the Session Initiation Protocol (SIP) and, more particularly, to systems and methods for establishing a SIP communication session with a terminal.

BACKGROUND OF THE INVENTION

One of the limitations of various versions of the Internet Protocol (IP) such as IPv4, is that it has a limited address space. Consequently, in order to conserve addresses, enterprises and other administrative domains have resorted to using private addresses. Private addresses are network addresses in which the IP address falls within the ranges of 10.0.0.0-10.255.255.255,
172.16.0.0-172.31.255.255, or
192.168.0.0-192.168.255.255.

Private addresses that are assigned by an administrative entity within a private network only have relevance within the respective private network. Accordingly, such private addresses are typically not visible outside the private network. An advantage of using private addresses, however, is that different private networks may assign the same private IP address to hosts within their respective private networks without any concern of conflict. On the other hand, a Network Address Translator (NAT), which can also function as Network Address Port Translator (NAPT), can be used when a host that is assigned a private address within a private network intends to send an IP datagram to a host that is outside the private network of the sending host. A NAT transforms a private IP address (and possibly other selected fields within the datagram) into a public IP address prior to the IP datagram being sent outside the private network associated with the NAT. With the added functionality of the NAPT, the NAT can further transform ports, such as Transmission Control Protocol (TCP) or User Datagram Protocol (UDP) ports, from the private network to the public network. Similarly, when an IP datagram is sent from a host that is outside the administrative domain associated with the NAT to a host with a private address, then the NAT transforms a public IP address to a private IP address and, with the NAPT added functionality, a port in the public network to a port in the private network.

In addition to providing address and port translations, the NAT can communicate with a firewall and/or gateway that operates as a security mechanism to an associated private network. In this regard, the firewall/gateway can operate to provide security in that, as before incoming datagrams pass through a translation process of the NAT and/or after outgoing datagrams pass through a translation process of the NAT, the firewall/gateway can be capable of qualifying such datagrams. In addition, by translating private IP addresses into public IP addresses, the NAT can be capable of providing a measure of privacy for those associated with the private IP addresses.

The use of private addresses within a private network and use of a NAT at the edge of a private network has been widely adopted and deployed within enterprises. There are, however, drawbacks associated with use of a NAT. In this regard, consider a private network comprising, connected to or otherwise associated with a mobile network, such as a General Packet Radio Service (GPRS) network. In such instances, a terminating node, such as a mobile terminal, communicating across the mobile network can generally initiate a communication session, such as in accordance with the Session Initiation Protocol (SIP), with an IP device across the NAT. An IP device typically cannot, however, initiate a similar SIP communication session with the terminating node across the NAT. In addition, because terminating nodes typically lack a static and public identity like a fixed IP-address, IP devices often cannot identify a desired terminating node to the NAT.

Mobile networks are typically configured in a manner that prevents an IP device from initiating a SIP communication session with a respective terminating node for a number of reasons. Firstly, depending upon the network topology, enabling IP-connectivity to terminating nodes within the network can consume an undesirable amount of resources or reduce performance of the network even when there is no IP-traffic across the network. Secondly, in the network, as in many private networks, there may be more terminating nodes than available IP-addresses. As such, the network may include a NAT, dynamically allocated IP addresses and/or private IP addresses. Thirdly, the security needs and policies of many networks require that various IP-traffic be prevented from passing into the network. Such an instance also often leads to the use of the NAT, particularly when the mobile networks include an associated firewall/gateway.

To overcome the drawback of the NAT to permit IP devices to initiate a SIP communication session with a terminating node, networks can be configured such that each terminating node has a unique, fixed IP address, where those addresses are entered into a respective Domain Name System (DNS) server. The NAT and any security components (e.g., firewall/gateway, etc.) of the network can also be configured to allow an IP device to initiate a SIP communication session with a terminating node and allow routing of traffic to and from the IP address allocated to the terminating node. In addition, for example, network technology-specific resources required for IP connectivity with each terminating node in the network can be allocated when the terminating node is connected to the network.

Such a technique for permitting IP devices to initiate a SIP communication session with a terminating node, however, ignores the limitations of public networks that lead to the use of NAT components. Namely, such a technique ignores the limitation of available public IP addresses. Also, such a technique ignores the ability of NAT components to communicate with firewalls/gateways, which provide security functionality. Thus, it would be desirable to design a system capable of permitting IP devices to initiate a SIP communication session with a terminating node in a mobile or private network that accounts for the limited address space of public networks and maintains firewall and/or gateway functionality to the respective network.

SUMMARY OF THE INVENTION

In light of the foregoing background, embodiments of the present invention provide an improved system and method for establishing a Session Initiation Protocol (SIP) communication session with a terminal, typically a mobile terminal having an associated private IP address. In contrast to conventional techniques for establishing an SIP communication session with a terminal, embodiments of the present invention permit SIP clients across a public network from the terminal (another SIP client) to initiate an SIP communication session with the terminal. More particularly, embodiments of the present invention permit SIP clients to initiate an SIP communication session with the terminal in a manner that accounts for the limited number of available public IP addresses, and maintains firewall and/or gateway functionality to the mobile network including the terminal.

According to one aspect of the present invention, a system is provided for establishing a communication session, such as a Session Initiation Protocol (SIP) communication session, with a terminal (i.e., terminating SIP client). The system includes a network node, such as a SIP proxy, located in a network across which an originating client is capable of communicating. The network node is capable of sending a trigger to the terminal independent of the network. The network node is also capable of receiving a registration message, such as a registration message subsequent to a first registration message, from the terminal, where the network node receives the registration message in response to the trigger. In this regard, the network node is capable of receiving the registration message to thereby register the terminal with the network node and identify the terminal across the network such that a communication session is capable of being established with the terminal based upon the identity of the terminal across the network.

More particularly, the network node can be capable of receiving the registration message from the terminal via a network address translator (NAT) and/or a firewall (FW) located between the network node and the terminal. As such, the network node can be capable of sending the trigger in a manner independent of the NAT and/or FW. The network node can also be capable of receiving a first registration message from the terminal before sending the trigger and receiving the subsequent registration message. In this regard, the network node can receive the first registration message to thereby register the terminal with the network node. In such instances, the first registration message includes an identifier of the terminal independent of the network. As such, the network node can be capable of sending the trigger based upon the identifier of the terminal independent of the network.

The system can further include a network node (i.e., originating SIP client) capable of sending a connection request to the network node. In such instances, the network node can be capable of sending the trigger in response to receiving the connection request. More particularly, the network node can be capable of receiving, and thereafter buffering, the connection request. The network node can then be capable of receiving the registration message, retrieving the connection request from the buffer, and thereafter sending the connection request to the terminal based upon the identity of the terminal across the network.

In accordance with another aspect of the present invention, a system of establishing a communication session with a terminal located within a mobile network or a private network includes a network node capable of receiving a registration message, such as a first registration message, to thereby register the terminal with the network node. In this regard, the registration message includes an identifier of the terminal independent of the network. The network node of this embodiment is also capable of triggering the terminal independent of the network based upon the identifier of the terminal to thereby identify the terminal across the network. Further, the network node is capable of triggering the terminal such that a communication session can be established with the terminal based upon the identity of the terminal across the network.

According to other aspects of the present invention, a terminal and method for establishing a communication session with a terminal are provided. Therefore, embodiments of the present invention provide an improved system and method for establishing a communication session with a terminal. Embodiments of the present invention permit an originating client to initiate a connection with a terminal without requiring additional, or many additional, public IP addresses. Embodiments of the present invention further permit an originating client to initiate a connection with a terminal without obviating firewall and/or gateway functionality otherwise provided to a mobile network including the terminal, such as by a FW. Therefore, the system and method of embodiments of the present invention solve the problems identified by prior techniques and provide additional advantages.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
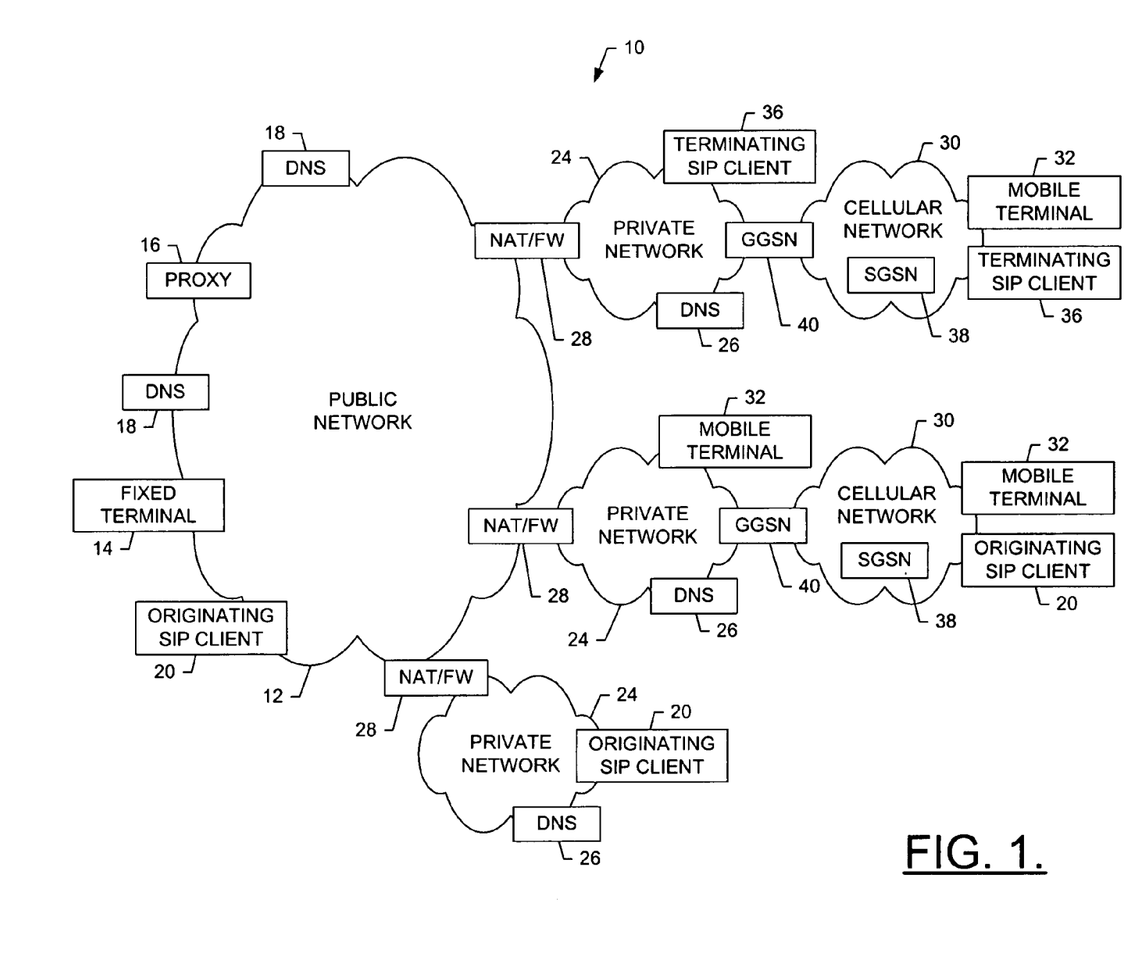
FIG. 1 is a schematic block diagram of a communications system according to one embodiment of the present invention including a public network and a mobile network to which an originating SIP client and a terminating SIP client are bi-directionally coupled directly or indirectly.

Referring to FIG. 1, an illustration of one type of system that would benefit from the present invention is provided. The system and method of embodiments of the present invention will be primarily described in conjunction with mobile communications applications. It should be understood, however, that the system and method of embodiments of the present invention can be utilized in conjunction with a variety of other applications, both in the mobile communications industries and outside of the mobile communications industries.

As shown, the system 10 includes a public network 12, such as a public Internet Protocol (IP) network like the Internet. The public network includes a number of network nodes, each of which typically comprise a processing element such as a server computer, personal computer, laptop computer or the like. More particularly, the public network can include one or more network nodes comprising fixed terminals 14, each of which are capable of communicating within or across the public network. The network nodes of the public network 12 can also include a proxy 16, such as Session Initiation Protocol (SIP) proxy. As will be appreciated, calling models such as SIP provide an application layer signaling protocol related to multimedia sessions (see, e.g., IETF request for comment document RFC 3261, entitled: *SIP: Session Initiation Protocol*, June 2002, the contents of which are hereby incorporated by reference in its entirety). The SIP proxy is therefore capable of receiving and forwarding SIP signaling messages, such as SIP signaling messages to and/or from a network node comprising a fixed terminal operating as an originating SIP client 20, as such is described in greater detail below.

In addition, the public network 12 can include one or more Domain Name System (DNS) servers 18. In this regard, each network node typically has a unique IP address that has an associated, typically easier to recall, host DNS name. The DNS servers, then, can be capable of transforming a host DNS name into the associated IP address such that network traffic can be routed to the appropriate network node.

In addition to the public network 12, the system 10 includes one or more private networks 24, such as Local Area Networks (LANs). Each private network, like the public network, can include a number of network nodes. Also, like the public network 12, the network nodes of each private network can include one or more DNS servers 26. Similar to before, the DNS servers of the private networks can be capable of transforming a host DNS name into an associated IP address such that network traffic can be routed to the appropriate public or network node. The private network can also include one or more network nodes comprising mobile terminals 32, each of which are capable of communicating within or across the private network. The terminals 32 can comprise, for example, mobile telephones, portable digital assistants (PDAs), pagers, laptop computers, smart cards and other types of electronic systems.

To facilitate the terminals 32 accessing the private network, the private network 24 can include one or more wireless access points (AP's) (not shown), each of which can be coupled to one or more terminals. In this regard, the AP's can comprise access points configured to communicate with the terminal in accordance techniques such as, for example, radio frequency (RF), Bluetooth (BT), infrared (IrDA) or any of a number of different wireline and/or wireless networking techniques, including LAN and/or WLAN techniques. Also, like the public network, the private network can include an originating SIP client 20, which is described in greater detail below. As described below, the private network can include a terminating SIP client 36, which can be capable of communicating with an originating SIP client. And as also described below, one or more of the terminals of the private network can be capable of operating as an originating SIP client or a terminating SIP client.

To facilitate communications between network nodes of the public network 12 and network nodes of the private networks 24, each private network can further include a Network Address Translator (NAT) interconnecting the public network and the private network. As explained above in the background section, each NAT can be capable of transforming a public IP address from the public network into a private IP address of a network node of a respective private network, and vice versa, for communications between the public network and the respective private network. As will be appreciated, the NAT can also include an Application Level Gateway (ALG) (not shown) capable of transforming IP addresses embedded in, for example, application protocol data units (PDUs). In addition, the NAT can include or be associated with a firewall and/or gateway for the respective private network. As shown, then, a NAT including or associated with a firewall/gateway is shown as a NAT/FW 28.

The system 10 can also include one or more mobile or cellular networks 30. The cellular networks can comprise one or more of a number of different mobile networks. In this regard, the cellular networks can comprise any of a number of first-generation (1G), second-generation (2G), 2.5G and/or third-generation (3G) cellular networks, and/or any of a number of other cellular networks capable of operating in accordance with embodiments of the present invention. For example, each cellular network can comprise a GSM (Global System for Mobile Communication), IS-136 (Time Domain Multiple Access—TDMA), IS-95 (Code Division Multiple Access—CDMA), or EDGE (Enhanced Data GSM Environment) network. Alternatively, one or more of the cellular networks can comprise GPRS (General Radio Packet Service) or GPRS-based (e.g., Universal Mobile Telecommunications System—UMTS) networks.

Like the public and private networks 12, 24, the cellular networks 30 also include one or more network nodes. In this regard, the network nodes of each cellular network can include one or more mobile terminals 32 capable of communicating within and/or across a respective cellular network. And as described below, one or more of the mobile terminals are capable of operating as an originating SIP client 20, such as in the same manner as the originating nodes of the public and private networks. In addition, as also described below, one or more of the mobile terminals are capable of operating as a terminating SIP client 38 which, as indicated above and described below, can be capable of communicating with an originating SIP client via a SIP proxy 16 in accordance with SIP.

Within the cellular networks 30, the network nodes can also include one or more network signaling support nodes such as one or more SGSNs (signaling GPRS support nodes) 38, and one or more gateway support nodes such as one or more GGSNs (gateway GPRS support nodes) 40. For example, the network nodes can include one or more SGSNs and one or more GGSNs, as such are described in a number of specifications of the 3G Partnership Project (3GPP). As will be appreciated by those skilled in the art, the SGSNs are capable of routing communications to and from the mobile terminals 32, and can also provide a connection to the other network nodes when the terminals are involved in a communication session with such network nodes. The GGSNs, on the other hand, are capable of interconnecting the cellular networks and the private networks 24. In this regard, the GGSNs are capable of performing traditional gateway actions, as such are well known. It should be noted that although the cellular networks can include SGSNs and GGSNs, the cellular networks can comprise other similarly operating network nodes for other types of cellular networks.

Figure 2:
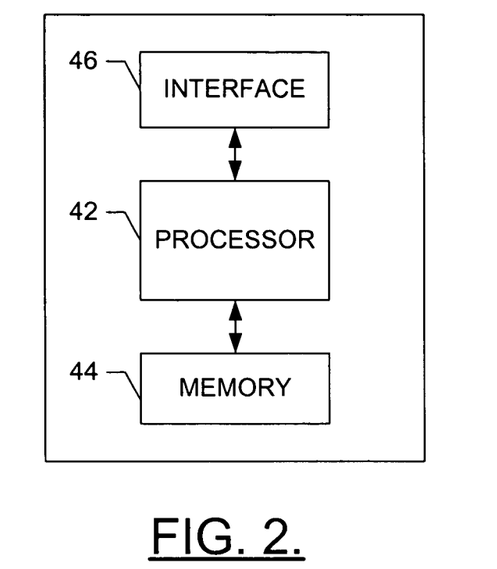
FIG. 2 is a schematic block diagram of an entity capable of operating as a SIP client, in accordance with embodiments of the present invention.

Reference is now made to FIG. 2, which illustrates a block diagram of an entity capable of operating as a network node (e.g., SIP proxy 16, originating SIP client 20, NAT/FW 28, terminating SIP client 36, SGSN 38, GGSN 40, etc.) within the public network 12, private networks 24 or cellular networks 30, in accordance with one embodiment of the present invention. Although shown as separate entities, in some embodiments, one or more entities may support one or more of the network nodes, logically separated but co-located within the entit(ies). For example, a single entity may support a logically separate, but co-located, originating SIP client and SIP proxy. Also, for example, as indicated above, a single entity may support a logically separate, but co-located NAT and firewall/gateway.

As shown, the entity capable of operating as a network node can generally include a controller 42, processor or the like connected to a memory 44. The controller can also be connected to at least one interface 46 or other means for transmitting and/or receiving data, content or the like. The memory can comprise volatile and/or non-volatile memory, and typically stores content, data or the like. For example, the memory typically stores software applications, instructions or the like for the controller to perform steps associated with operation of the entity in accordance with embodiments of the present invention. Also, for example, the memory typically stores content transmitted from, or received by, the network node.

Figure 3:
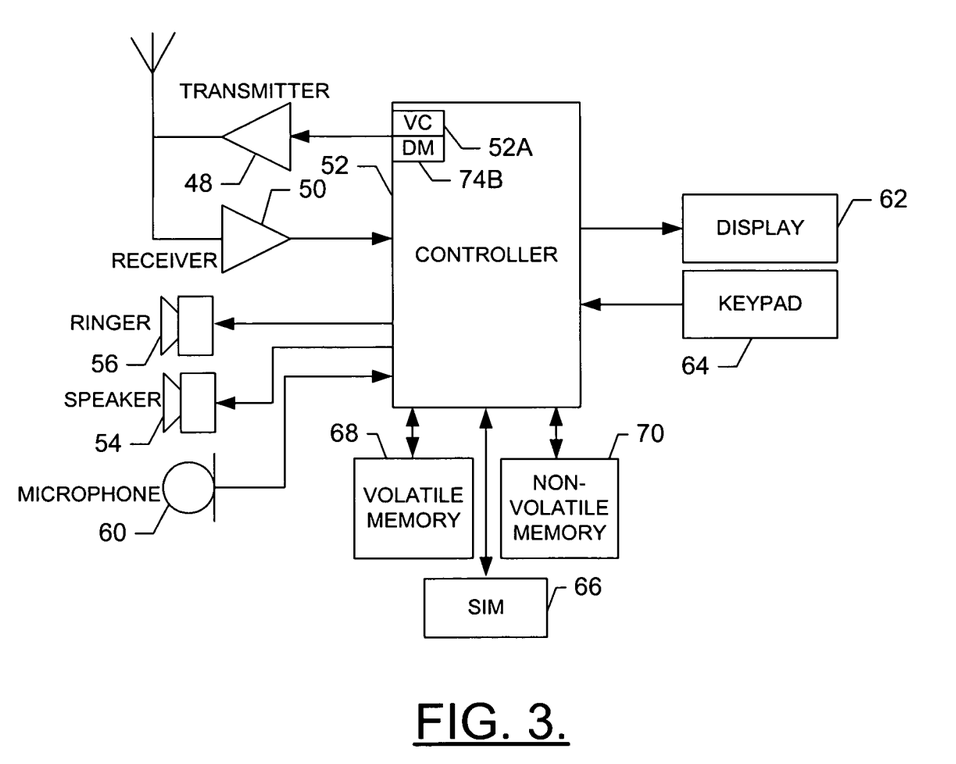
FIG. 3 is a schematic block diagram of a mobile station that may operate as a SIP client, according to embodiments of the present invention.

FIG. 3 illustrates a functional diagram of a mobile station that may operate as a mobile terminal 32 and, as such, an originating SIP client 20 or terminating SIP client 36, according to embodiments of the invention. It should be understood, that the mobile station illustrated and hereinafter described is merely illustrative of one type of mobile terminal that would benefit from the present invention and, therefore, should not be taken to limit the scope of the present invention. While several embodiments of the mobile station are illustrated and will be hereinafter described for purposes of example, other types of mobile terminals, such as portable digital assistants (PDAs), pagers, laptop computers and other types of voice and text communications systems, can readily employ the present invention.

The mobile station includes a transmitter 48, a receiver 50, and a controller 52 that provides signals to and receives signals from the transmitter and receiver, respectively. These signals include signaling information in accordance with the air interface standard of the applicable cellular system, and also user speech and/or user generated data. In this regard, the mobile station can be capable of operating with one or more air interface standards, communication protocols, modulation types, and access types. More particularly, the mobile station can be capable of operating in accordance with any of a number of 1G, 2G, 2.5G and/or 3G communication protocols or the like. For example, the mobile station may be capable of operating in accordance with 2G wireless communication protocols IS-136 (TDMA), GSM, and IS-95 (CDMA). Also, for example, the mobile station may be capable of operating in accordance with 2.5G wireless communication protocols GPRS, Enhanced Data GSM Environment (EDGE), or the like. Some narrow-band AMPS (NAMPS), as well as TACS, mobile stations may also benefit from embodiments of the present invention, as should dual or higher mode mobile stations (e.g., digital/analog or TDMA/CDMA/analog phones).

It is understood that the controller 52 includes the circuitry required for implementing the audio and logic functions of the mobile station. For example, the controller may be comprised of a digital signal processor device, a microprocessor device, and various analog to digital converters, digital to analog converters, and other support circuits. The control and signal processing functions of the mobile station are allocated between these devices according to their respective capabilities. The controller thus also includes the functionality to convolutionally encode and interleave message and data prior to modulation and transmission. The controller can additionally include an internal voice coder (VC) 52A, and may include an internal data modem (DM) 52B. Further, the controller may include the functionally to operate one or more software applications, which may be stored in memory.

The mobile station also comprises a user interface including a conventional earphone or speaker 54, a ringer 56, a microphone 60, a display 62, and a user input interface, all of which are coupled to the controller 52. The user input interface, which allows the mobile station to receive data, can comprise any of a number of devices allowing the mobile station to receive data, such as a keypad 64, a touch display (not shown) or other input device. In embodiments including a keypad, the keypad includes the conventional numeric (0-9) and related keys (#, *), and other keys used for operating the mobile station.

Although not shown, the mobile station can further include an IrDA transceiver or another local data transfer device so that data can be shared with and/or obtained from other devices such as other mobile stations, car guidance systems, personal computers, printers, printed materials including barcodes and the like. The sharing of data, as well as the remote sharing of data, can also be provided according to a number of different techniques. For example, the mobile station may include a RF transceiver capable of sharing data with other radio frequency transceivers, and/or with a Radio Frequency Identification (RFID) transponder tag, as such is known to those skilled in the art. Additionally, or alternatively, the mobile station may share data using BT brand wireless technology developed by the Bluetooth Special Interest Group. Further, the mobile station may be capable of sharing data in accordance with any of a number of different wireline and/or wireless networking techniques, including LAN and/or WLAN techniques.

The mobile station can also include memory, such as a subscriber identity module (SIM) 66, a removable user identity module (R-UIM) or the like, which typically stores information elements related to a mobile subscriber. In addition to the SIM, the mobile station can include other memory. In this regard, the mobile station can include volatile memory 68, as well as other non-volatile memory 70, which can be embedded and/or may be removable. For example, the other non-volatile memory can comprise embedded or removable multimedia memory cards (MMCs), Memory Sticks manufactured by Sony Corporation, EEPROM, flash memory, hard disk or the like. The memories can store any of a number of pieces of information, and data, used by the mobile station to implement the functions of the mobile station. For example, the memories can store an identifier, such as an international mobile equipment identification (IMEI) code, international mobile subscriber identification (IMSI) code, mobile station integrated services digital network (MSISDN) code or the like, capable of uniquely identifying the mobile station. The memories can also store content, such as that to transmit to, or that received from, an originating SIP client 20.

As indicated in the background section, conventional techniques for permitting an IP device, such as an originating SIP client 20, to initiate communication with a terminating SIP client 36, such as a mobile terminal, ignore the limitations of the public domains like the public network 12 (e.g., Internet) that lead to the use of the NAP/FW 28 to interconnect the public network to a respective private network 24. Namely, such techniques ignore the limitation of available public IP addresses. Also, such a technique ignores the ability of the NAP/FW to provide firewall and/or gateway functionality to a respective private network. Thus, embodiments of the present invention provide an improved system and method for communicating with a terminating node, where the terminating node resides in a cellular or otherwise mobile network. More particularly, embodiments of the present invention provide a system and method that permit originating SIP clients to initiate a SIP connection with terminating SIP clients while accounting for the limited address space of public domains. In addition, the system and method can, but need not, permit originating nodes to initiate an IP connection with terminating nodes while maintaining firewall and/or gateway functionality to the mobile network. As described below, the originating SIP client initiates communication with a terminating SIP client comprising a terminal within a cellular network 30. It should be understood, however, that the terminating SIP client can alternatively comprise a network node of a private network, without departing from the spirit and scope of the present invention.

As well known to those skilled in the art, SIP is an application-layer control protocol that can establish, modify and terminate multimedia sessions or calls. SIP is text-based, using ISO 10646 in UTF-8 encoding throughout. The syntax of the messages is similar to HTTP, except that SIP can carry the transaction using either User Datagram Protocol (UDP) or Transmission Control Protocol (TCP). A SIP message can typically be characterized as either a request or a response, and it can be created following the format of Internet Engineering Task Force (IETF) request for comment document RFC 822, entitled: *Standard for the Format of ARPA Internet Text Messages*, August 1982, the contents of which are hereby incorporated by reference in its entirety.

Generally, the entities involved in a SIP session include a user agent (e.g., originating SIP client 20, terminating SIP client 36, etc.), the SIP proxy 16, a registrar and a location service. The user agent can function as a client (UAC) that initiates a SIP request. The user agent can also operate as a server (UAS) that contacts the user when a SIP request is received, and sends back a response on behalf of the user. The SIP proxy 16, as indicated above, comprises an intermediate entity that can simultaneously function like a client and server. In this regard, the SIP proxy can interpret and modify a SIP request before forwarding it to other servers. The registrar, which can be implemented in the SIP proxy, accepts user registrations (e.g., REGISTER messages) and can make this information available through a location service, also capable of being implemented in the SIP proxy. The location service, then, comprises an element used by the SIP proxy to obtain information about the possible location of a terminating SIP client 36.

A SIP message generally comprises a start line, one or more header fields, an empty line (carriage-return line-feed—CRLF) and an optional body. Generally, the start line of a SIP message indicates if the message is a request (e.g., INVITE, ACK, OPTIONS, BYE, CANCEL, REGISTER, etc.) or a response (e.g., 100 Informational, 200 Success, 300 Redirection, 400 Client Error, 500 Server Error, 600 Global Failure, etc.). The message header can include multiple headers indicating, for example, the source ("From:"), destination ("To:"), call identifier ("Call-ID:"), message sequence ("Cseq:"), contact ("Contact:"), transaction path ("Via:"), length ("Content-Length:") and content ("Content-Type:") of the body, if carried in the message. The message body, on the other hand, can include any of a number of different types of data, the interpretation of which typically depends upon the type of message. Generally, the content of the body can contain a session description following a specific format such as the Session Description Protocol (SDP), text or Extensible Markup Language (XML) scripts. In this regard, the "Content-Type" header field gives the media type of the message body. If the body is encoded, such encoding is typically indicated in the "Content-Encoding" header field, and the body length is typically given in the "Content-Length" header field.

The entities addressed by SIP can include users that can be accessed via SIP proxies 16 supporting such users, where the users can be identified by a SIP uniform resource locator (URL). Generally, SIP URLs are used within SIP messages to indicate, for example, the originator (From), the current destination in the start line (request URL), and the final recipient (To) of a SIP request. As will be appreciated, the URL can take a form such as "user@host," where "user" typically identifies a user (e.g., user name, telephone number, etc.) and "host" identifies a SIP proxy (e.g., domain name, IP address, etc.) supporting the user. In this regard, SIP URLs can be used for locating a user based upon a domain name-to-IP address translation by a DNS server 18, particularly when the URL includes the domain name of the respective SIP proxy. In this regard, the originator can query the DNS server including the destination address including the domain name of the SIP proxy.

As indicated above, the system 10 can include an originating SIP client 20 and a terminating SIP client 36. Generally, the originating SIP client is capable of requesting a connection with a terminating SIP client via a SIP proxy 16 supporting the terminating SIP client. The originating SIP client can also generally, operate as a peer node of a SIP communication session. Likewise, the terminating node can be capable of operating as another peer node of a SIP communication session. And as well known to those skilled in the art, the SIP proxy can be capable of forwarding SIP signaling messages to the terminating SIP client from the originating SIP client, and vice versa. In contrast to conventional SIP communication techniques, however, when the terminating SIP client is located behind a NAT/FW 28 from the originating SIP client, the SIP proxy may not be capable of identifying the terminating SIP client across the NAT/FW when the originating SIP client desires to initiate a SIP communication session with the terminating SIP client. More particularly, for example, the SIP proxy may not be capable of identifying the terminating SIP client when the NAT/FW no longer maintains a translation table entry for the terminating SIP client or the SIP proxy no longer maintains a registration for a public IP address and port assigned by the NAT/FW to the terminating SIP client.

In accordance with embodiments of the present invention, then, the SIP proxy 16 can be capable of sending a non-IP-based trigger to the terminating SIP client 36 independent of the public and private networks 12, 24, to thereby instruct the terminating SIP client to re-register with the SIP proxy, such as across the NAT/FW 28. For example, the SIP proxy can be capable of sending a short messaging service (SMS) message, enhanced messaging service (EMS) message, multimedia messaging service (MMS) message or Wireless Application Protocol (WAP) push trigger to the terminating SIP client. In response to the trigger, the terminating SIP client can re-register with the SIP proxy such that the originating SIP client can thereafter communicate with the terminating SIP client via the SIP proxy. More particularly, in response to the trigger, the terminating SIP client can register with the SIP proxy through the NAT/FW such that the NAT/FW assigns a public IP address to the terminating SIP client, and such that the SIP proxy can register the terminating SIP client including the assigned public IP address.

To permit the SIP proxy 16 to send a non-IP-based trigger to the terminating SIP client 36, the SIP proxy is capable of identifying the terminating SIP client independent of an IP communication channel of the public and private networks 12, 24, and thus over a communication channel independent of the NAT/FW 28. For example, the SIP proxy can be capable of identifying a MSISDN or other identifier associated with a terminating SIP client. Based upon the MSISDN, then, the SIP proxy can send a SMS, EMS, MMS or WAP-push trigger to the terminating SIP client. In this regard, the SIP proxy can be capable of identifying a non-IP-based identifier of the terminating SIP client in any of a number of different manners. In one advantageous embodiment, the terminating SIP client registers with the SIP proxy before the SIP proxy receives a request from the originating SIP client 20 to communicate with the terminating SIP client. As the terminating SIP client registers with the SIP proxy, then, the terminating SIP client can send the SIP proxy an identifier (e.g., MSISDN) of the terminating SIP client outside an IP communication channel.

As will be appreciated, in various instances the terminating SIP client 36 and the SIP proxy 16 can have a pre-existing trust relationship. In such instances, the non-IP-based identifier of the terminating SIP client can be based upon such a trust relationship. In other instances, the terminating SIP client and the SIP proxy may not have a pre-existing trust relationship. In these instances, the terminating SIP client and the SIP proxy can, but need not, establish a trust relationship, such as in accordance with any of a number of different techniques. Prior to establishing such a trust relationship, then, the SIP proxy can communicate with the terminating SIP client via a non-IP-based identifier of the terminal that differs from the IP-based identifier used for sending non-IP-based triggers, such as to establish a trust relationship. Then, once a trust relationship has been established, the SIP proxy can send non-IP-based triggers to the terminal via a non-IP-based identifier of the terminal used for trusted communications.

Figure 4:
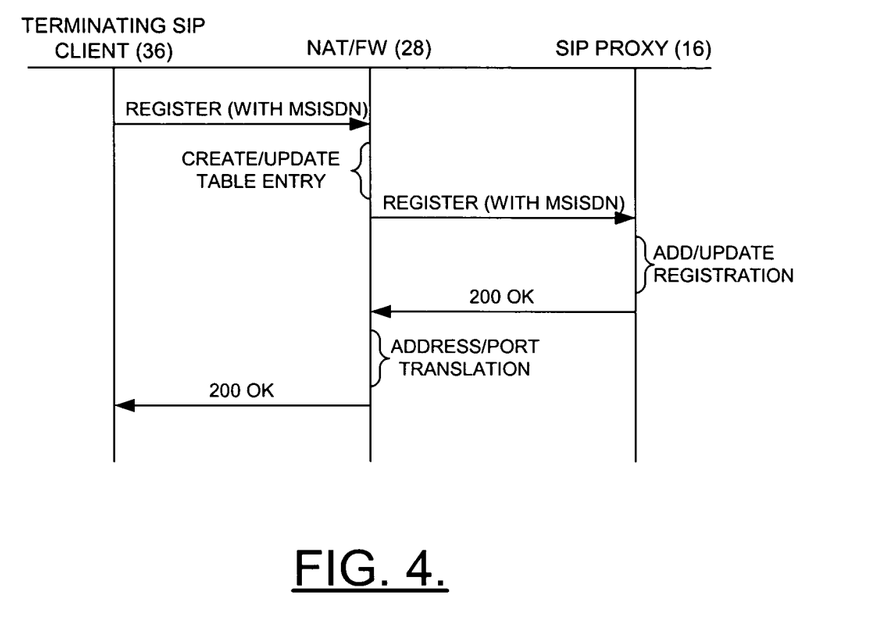
FIG. 4 is a control flow diagram more particularly illustrating a method of an SIP client, such as a terminating SIP client, registering with a SIP proxy, in accordance with one embodiment of the present invention.
Figure 5:
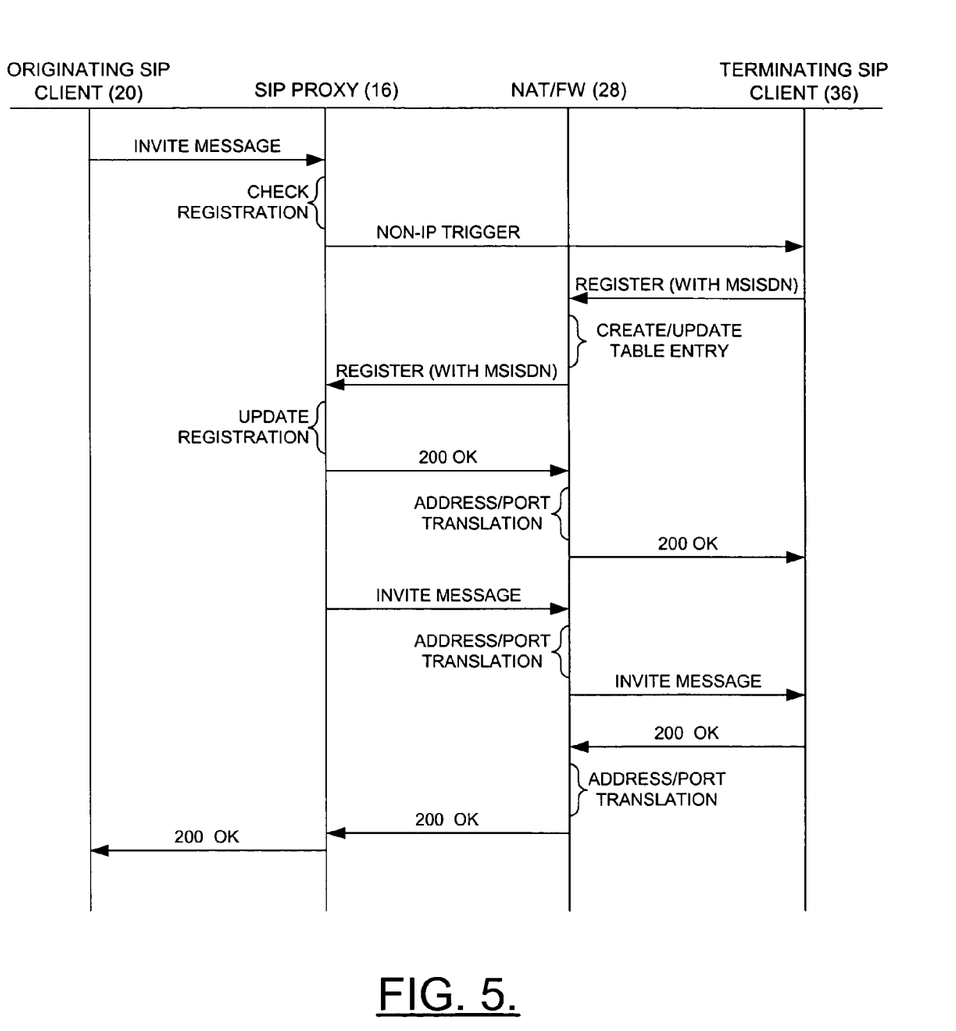
FIG. 5 is a control flow diagram more particularly illustrating a method of initiating a communication session between originating and terminating SIP clients, in accordance with an embodiment of the present invention.

Reference is now made to FIGS. 4 and 5, which illustrate examples of a terminating SIP client 36 registering with a SIP proxy 16, and an originating SIP client 20 initiating communication with a terminating SIP client via the SIP proxy, respectively, in accordance with embodiments of the present invention. For purposes of the examples shown in FIGS. 4 and 5, consider a terminating SIP client that has the private IP address: "10.11.12.13," and is capable of being identified by the user "client_A" and the host domain name "terminal_name" (i.e., URL: "client_A@terminal_name"). In addition, consider the terminating SIP client having the MSISDN: "3581234567." Also, for example, consider an originating SIP client 20 having the public IP address: "192.31.10.1," and a SIP proxy having the public IP address: "192.21.200.1." Further, consider a NAT/FW 28 being capable of assigning one or more IP addresses within a pool of IP addresses "192.21.200.123-192.21.200.223."

As shown in FIG. 4, the terminating SIP client 36 can register with the SIP proxy 16 by sending a SIP REGISTER message to the SIP proxy via a respective NAT/FW 28. The SIP REGISTER message can include any of a number of pieces of information, such as that described above. For example, header fields of the SIP REGISTER message can include a source identifying the private IP address of the terminating SIP client 36 and a first open communication port ("From: 10.11.12.13, 5060"). In the preceding, as will be appreciated, the first open communication port can comprise "5060," which corresponds to a communication port reserved for SIP messages sent in accordance with UDP or TCP (or Stream Control Transmission Protocol—SCTP). The header fields can also include, for example, a destination identifying the public IP address of the SIP proxy and the first open communication port ("To: 192.21.200.1, 5060"), and a contact identifying the user and domain name of the terminating SIP client ("Contact: sip:client_A@terminal_name"). In accordance with embodiments of the present invention, the header fields can further include a non-IP-based identifier of the terminating SIP client. For example, the header fields can further include the MSISDN of the terminating SIP client ("MSISDN: 3581234567").

In response to the SIP REGISTER message, the NAT/FW 28 can create a new transformation table entry for the terminating SIP client 36 associating the private IP address (i.e., "10.11.12.13") of the terminating SIP client with a public IP address and a second open communication port. For example, the NAT/FW can associate public IP address "192.21.200.123" and second open communication port "32456" to the terminating SIP client. In addition to creating a new transformation table entry, to permit communications between the intermediate node and the NAT/FW, if so desired, the NAT/FW can also add a new firewall (FW) filter allowing communications from the NAT/FW via the second open communication port and communications to the SIP proxy 16 via the first open communication port.

After creating a new transformation table entry, the NAT/FW 28 can transform the private IP address and port in the header fields of the SIP REGISTER message into the public IP address and port assigned to the terminating SIP client 36 by the NAT/FW. Thus, continuing the previous example, the NAT/FW can transform the source header comprising "From: 10.11.12.13, 5060" into a source header comprising "From: 192.21.200.123, 32456." Also, depending upon the operation of the ALG of the NAT/FW, a contact identifying the user and domain name of the terminating SIP client can be translated to identify the public IP address and port assigned to the terminating SIP client by the NAT/FW. Then, after transforming the address and port of the SIP REGISTER message, the NAT/FW can pass the transformed SIP REGISTER message to the SIP proxy 16 for registration.

Upon receiving the transformed register message, the SIP proxy 16 can create a new registration entry, or update a previous registration entry, for the terminating SIP client 36. The registration entry can include, for example, the public IP address and port assigned to the terminating SIP client by the NAT/FW 28, and the contact identifying the user and domain name of the terminating SIP client ("Contact: sip: client_A@terminal_name"). In this regard, the SIP proxy can bind the user and domain name of the terminating SIP proxy to the public IP address and port assigned to the terminating SIP client by the NAT/FW. In addition to the public address and port, and in accordance with embodiments of the present invention, the registration entry can include the non-IP-based identifier of the terminating SIP client (e.g., "MSISDN: 3581234567").

After creating or updating a registration entry for the terminating SIP client 36, the SIP proxy 16 can confirm reception and creation/updating of the registration entry. In this regard, the SEP proxy can send an acknowledgement, such as a 200 OK message, to the terminating SIP client via the NAT/FW 28. The 200 OK message can include, for example, header fields having any of a number of different pieces of information, as such is well known. For example, the header fields of the 200 OK message can include a source identifying the public IP address of the SIP proxy and the first open communication port ("From: 192.21.200.1, 5060"). The header fields can also include, for example, a destination identifying the assigned public IP address of the terminating SIP client and the second communication port ("To: 192.21.200.123, 32456").

In response to the 200 OK message, the NAT/FW 28 can transform the public IP address assigned to the terminating SIP client 36 and the second communication port into the private IP address of the terminating SIP client and the first communication port. Thus, for example, the NAT/FW can transform the destination header comprising "To: 192.21.200.123, 32456" into the destination header comprising "To: 10.11.12.13, 5060." The NAT/FW can thereafter pass the transformed 200 OK message to the terminating SIP client.

With the terminating SIP client 36 registering with the SIP proxy 16, the SIP proxy can forward SIP messages to the terminating SIP client. In various instances, such as after a "time-to-live" period, however, the NAT/FW 28 may remove the translation table entry for the terminating SIP client. Additionally, or alternatively, for example, the SIP proxy may cease to maintain the registration entry for the terminating SIP client, including the public IP address and port assigned by the NAT/FW to the terminating SIP client. In either instance, as will be appreciated, the SIP proxy may not be capable of identifying the terminating SIP client across the NAT/FW to thereby forward SIP messages to the terminating SIP client via the NAT/FW.

Reference is now made to FIG. 5, which illustrates an exemplar instance in which the SIP proxy 16 is incapable of identifying the terminating SIP client 36 across the NAT/FW 28. As shown, an originating SIP client 20 desires to initiate a SIP communication session with the terminating SIP client 36. To initiate communication, the originating SIP client can send a SIP INVITE message to the terminating SIP client. In this regard, the originating SIP client can send the SIP INVITE message to a SIP proxy 16 supporting the originating SIP client, which may be the same or different than the SIP proxy supporting the terminating SIP client. The SIP proxy supporting the originating SIP client can then forward the SIP INVITE message to the SIP proxy (shown in FIG. 6) supporting the terminating SIP client. In this regard, the SIP INVITE message can be forwarded directly to the SIP proxy supporting the terminating SIP client or indirectly to the SIP proxy supporting the terminating SIP client, such as via one or more intermediate SIP proxies. As described below, then, the SIP proxy refers to the SIP proxy supporting the terminating SIP client, unless otherwise stated.

As will be appreciated by those skilled in the art, the SIP INVITE message can include any of a number of different pieces of information. For example, header fields of the SIP INVITE message can include a source identifying a public IP address of the originating SIP client 20 and the first open communication port ("From: 192.31.10.1, 5060"). More particularly, the source header field can identify the public IP address of the SIP proxy supporting the originating SIP client and the first open communication port. The header fields can also include, for example, a destination identifying the user and domain name of the terminating SIP client 36 ("To: sip: client_A@terminal_name").

Upon receipt of the SIP INVITE message, the SIP proxy 16 can search its registration entries for an entry for the user and domain name of the terminating SIP client 36. In various instances, however, the SIP proxy can recognize that the NAT/FW 28 has removed the translation table entry for the terminating SIP client, such as based upon a "time-to-live" period, or that the SIP proxy has ceased to maintain the registration entry for the terminating SIP client. In such instances, the SIP proxy can recall the non-IP-based identifier of the terminating SIP client (e.g., ("MSISDN: 3581234567")) from the previous registration entry for the terminating SIP client of the terminating SIP client (see FIG. 5). In addition, the SIP proxy can buffer the SIP INVITE message from the originating SIP client 20, such as into a memory (e.g., memory 44) of the SIP proxy. And as will be appreciated, in various instances, the originating SIP client may send more than one SIP INVITE message before the SIP proxy can process the SIP INVITE message, as described below. In such instances, the SIP proxy can maintain the buffer of the SIP INVITE message, such as by overwriting the SIP INVITE message with each subsequent SIP INVITE message from the originating SIP client to the terminating SIP client.

After recalling the non-IP-based identifier of the terminating SIP client 36, the SIP proxy 16 can send a non-IP-based trigger to the terminating SIP client based upon the non-IP-based identifier, thereby instructing the terminating SIP client to re-register with the SIP proxy. For example, the SIP proxy can send a SMS message, EMS message, MMS message or WAP-push trigger to the terminating SIP client across the cellular network 30 independent of the public and private networks 12, 24, and thus the NAT/FW. The non-IP-based trigger can include any of a number of different pieces of information instructing the terminating SIP client to re-register with the SIP proxy. In addition, the non-IP-based trigger can identify the originating SIP client. In such instances, the terminating SIP client can decide whether to re-register with the SIP proxy based upon the identity of the originating SIP client.

In response to the trigger, the terminating SIP client 36 can re-register with the SIP proxy 16 such that the NAT/FW 28 can again assign a public IP address and communication port to the terminating SIP client, and the SIP proxy can update its registration entry for the terminating SIP client. More particularly, as before, once the terminating SIP client receives the trigger, the terminating SIP client can send a SIP REGISTER message to the SIP proxy via a respective NAT/FW, where the SIP REGISTER message can again include a non-IP-based identifier (e.g., MSISDN) of the terminating SIP client. In response to the SIP REGISTER message, the NAT/FW 28 can again create a new transformation table entry for the terminating SIP client 36 associating the private IP address (i.e., "10.11.12.13") of the terminating SIP client with a public IP address (e.g., "192.21.200.124") and a second (or third) open communication port (e.g., third communication port "32457").

After creating a new transformation table entry, the NAT/FW 28 can transform the private IP address and port in the header fields of the SIP REGISTER message from the terminating SIP client 36 into the public IP address and port assigned to the terminating SIP client by the NAT/FW. Then, the NAT/FW can pass the transformed SIP REGISTER message to the SIP proxy 16 for registration. As before, upon receiving the transformed register message, the SIP proxy can update the previous registration entry for the terminating SIP client (see FIG. 5). Also, as before, the registration entry can include the non-IP-based identifier of the terminating SIP client (e.g., MSISDN).

After updating the registration entry for the terminating SIP client 36, the SIP proxy 16 can confirm reception and creation/updating of the registration entry. As before, for example, the SIP proxy can send a 200 OK message to the terminating SEP client via the NAT/FW 28. The SIP proxy can then retrieve, from the respective registration entry, the public IP address and port assigned to the terminating SIP client based upon the user and domain name of the terminating SIP client, included in both the buffered SIP INVITE message and the respective registration entry. The SIP proxy can then retrieve the buffered SIP INVITE message, and transform the destination identifying the user and domain name of the terminating SIP client ("To: sip: client_A@terminal_name") with the assigned public IP address and port ("To: 192.21.200.124, 32457").

After transforming the SIP INVITE message to include the assigned public IP address and port of the terminating SIP client 36, the SIP proxy 16 can forward the SIP INVITE message to the terminating SIP client via the NAT/FW 28. In this regard, from the SIP proxy, the NAT/FW can receive the SIP INVITE message and lookup the transformation table entry for the terminating SIP client based upon the assigned public IP address and communication port of the terminating SIP client (included in the transformed SIP INVITE message). The NAT/FW can then transform the destination of the SIP INVITE message from the assigned public IP address and communication port, to the private IP address of the terminating SIP client and the first communication port. For example, the NAT/FW can transform the destination header field comprising "To: 192.21.200.124, 32457" into the destination header field comprising "To: 10.11.12.13, 5060."

After transforming the destination header of the SIP INVITE message, the NAT/FW 28 can forward the SIP INVITE message to the originating SIP client 36 based upon the private LP address of the originating SIP client and the first communication port. The originating SIP client can then confirm reception of the SIP INVITE message. In this regard, the originating SIP client can send a 200 OK message to the originating SIP client via the NAT/FW 28 and the SIP proxy 16. The 200 OK message can include, for example, a source header field identifying the private IP address of the originating SIP client and first communication port ("From: 10.11.12.13, 5060"), and a destination header field identifying the public IP address of the terminating SIP client 20 and the first communication port ("To: 192.31.10.1, 5060").

In response to the 200 OK message, the NAT/FW 28 can transform the private IP address and first communication port to the assigned public IP address and third communication port from the transformation table entry for the terminating SIP client 36. The NAT/FW can thereafter pass the transformed 200 OK message to the SIP proxy 16, which can forward the 200 OK message to the originating SIP client. Upon receipt of the 200 OK message, a communication session between the originating SIP client 20 and terminating SIP client can be established in accordance with session parameters included in the SIP INVITE and 200 OK response such that the originating and terminating SIP clients can communicate, as will be appreciated by those skilled in the art. For example, the originating and terminating SIP clients can participate in a multimedia communication session in accordance with any of a number of different protocols.

Further, as described herein, the terminating SIP client 36 is located behind a NAT/FW 28 from an originating SIP client 20. It should be appreciated, however, that the terminating node can be located behind a firewall/gateway (FW) without a NAT between the terminating SIP client and the originating SIP client. In such instances, embodiments of the present invention can be capable of permitting the originating SIP client to initiate communication with the terminating SIP client in instances in which the communication may otherwise be restricted by the FW, thereby maintaining the firewall and/or gateway functionality to the network including the terminal.

For example, as will be appreciated by those skilled in the art, a system 10 including a NAT for private/public address translation is typical of networks communicating in accordance with IP Version 4 (IPv4). It should be understood, however, that the system, or portions thereof, can alternatively be configured to communicate in accordance with IP Version 6 (IPv6), which supports longer IP addresses than IPv4. In this regard, because IPv6 supports longer IP addresses than IPv4, one or more of the private networks may not require a NAT to perform address/port translations. In such instances, the system may not include a NAT or NAT/FW, but instead includes a firewall/gateway (FW) capable of operating as a security mechanism to an associated private network, such as in the same manner as described above. The system can then operate as described above, although the terminating node can have an associated public IPv6 address. As such, the source or destination of communications between the originating SIP client and the terminating SIP client, that otherwise identify an assigned public IPv4 address of the terminating node that is translated by a NAT into a private IPv4 address, can identify the public IPv6 address of the terminating SIP client and pass without translation from a public IPv4 address to a private IPv4 address or vice versa.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising:
   a processor; and
   a memory including computer program code, the memory and computer program code configured to, with the processor, cause the apparatus to at least:
   receive a connection request via a network across which an originating client is configured to communicate;
   prepare a network-independent trigger for transmission to a terminal in response to receipt of the connection request; and
   receive a registration message, in response to the trigger, from the terminal via the network to thereby register the terminal with the apparatus and acquire a network-dependent identity of the terminal to thereby enable establishment of a communication session with the terminal based upon the network-dependent identity of the terminal.

2. An apparatus according to claim 1, wherein the apparatus being caused to receive a connection request comprises the apparatus being caused to receive a connection request from the originating client, and wherein the memory and computer program code are further configured to, with the processor, cause the apparatus to further prepare the connection request for transmission to the terminal after registering the terminal.

3. An apparatus according to claim 2, wherein the apparatus being caused to prepare the connection request comprises the apparatus being caused to prepare the connection request for transmission to the terminal through at least one other apparatus.

4. An apparatus according to claim 1, wherein the apparatus is embodied in a Session Initiation Protocol (SIP) proxy.

5. An apparatus according to claim 1, wherein the apparatus being caused to receive a connection request comprises the apparatus being caused to receive a connection request, and thereafter cause the connection request to be stored in a buffer, and wherein the apparatus being caused to prepare the connection request comprises the apparatus being caused to retrieve the connection request from the buffer and thereafter prepare the connection request for transmission to the terminal based upon the network-dependent identity of the terminal.

6. An apparatus according to claim 1, wherein the apparatus being caused to receive a registration message comprises the apparatus being caused to receive a registration message from the terminal via at least one of a network address translator (NAT) or a firewall (FW) operating between the apparatus and the terminal, and wherein the apparatus being caused to prepare a network-independent trigger comprises the apparatus being caused to prepare a network-independent trigger for transmission in a manner independent of the at least one of the NAT or FW.

7. An apparatus according to claim 1, wherein the apparatus being caused to receive a registration message comprises the apparatus being caused to receive a subsequent registration message, and wherein the memory and computer program code are further configured to, with the processor, cause the apparatus to further:

receive a first registration message from the terminal before preparation of the network-independent trigger for transmission to thereby register the terminal with the apparatus, wherein the first registration message includes a network-independent identity of the terminal, and wherein the apparatus being caused to prepare a network-independent trigger comprises the apparatus being caused to prepare a network-independent trigger for transmission based upon the network-independent identity of the terminal.

8. An apparatus according to claim 1, wherein the apparatus being caused to prepare a network-independent trigger comprises the apparatus being caused to prepare a network-independent trigger for transmission to the terminal via a network across which an originating client is configured to at least one of directly or indirectly communicate.

9. An apparatus according to claim 8, wherein the network comprises at least one of a public network or a private network.

10. An apparatus comprising:
a processor; and
a memory including computer program code, the memory and computer program code configured to, with the processor, cause the apparatus to at least:
receive a registration message via a network across which an originating client is configured to communicate, wherein the apparatus being caused to receive a registration message comprises the apparatus being caused to receive a registration message from a terminal to thereby register the terminal with the apparatus, and wherein the registration message includes a network-independent identity of the terminal; and
prepare a network-independent trigger for transmission to the terminal based upon the network-independent identity of the terminal to thereby trigger the terminal to update registration of the terminal with the apparatus, including acquisition by the apparatus of a network-dependent identity of the terminal to thereby enable establishment of a communication session with the terminal based upon the network-dependent identity of the terminal.

11. An apparatus according to claim 10, wherein the memory and computer program code are further configured to, with the processor, cause the apparatus to further:
receive a connection request, the trigger being prepared for transmission in response to receipt of the connection request; and
prepare the connection request for transmission to the terminal after acquisition of the network-dependent identity of the terminal.

12. An apparatus according to claim 11, wherein the apparatus being caused to prepare the connection request comprises the apparatus being caused to prepare the connection request for transmission to the terminal through at least one other apparatus.

13. An apparatus according to claim 11, wherein the apparatus being caused to receive a connection request comprises the apparatus being caused to receive a connection request, and thereafter cause the connection request to be stored in a buffer, and wherein the apparatus being caused to prepare the connection request for transmission comprises the apparatus being caused to retrieve the connection request from the buffer and thereafter prepare the connection request for transmission to the terminal based upon the network-dependent identity of the terminal to thereby enable establishment of the communication session.

14. An apparatus according to claim 10, wherein the apparatus is embodied in a Session Initiation Protocol (SIP) proxy.

15. An apparatus according to claim 10, wherein the apparatus being caused to receive a registration message comprises the apparatus being caused to receive a registration message from the terminal via at least one of a network address translator (NAT) or a firewall (FW) operating between the apparatus and the terminal, and wherein the apparatus being caused to prepare a network-independent trigger comprises the apparatus being caused to prepare a network-independent trigger for transmission to the terminal in a manner independent of the at least one of the NAT or the FW.

16. An apparatus according to claim 10, wherein the apparatus being caused to receive a registration message comprises the apparatus being caused to receive a first registration message, and wherein the memory and computer program code are further configured to, with the processor, cause the apparatus to further:
receive a subsequent registration message from the terminal in response to the trigger being sent to the terminal to thereby update registration of the terminal and acquire the network-dependent identity of the terminal, thereby enabling establishment of a communication session with the terminal based upon the network-dependent identity of the terminal.

17. An apparatus according to claim 10, wherein the apparatus being caused to receive a registration message comprises the apparatus being caused to receive a registration message via a network across which an originating client is configured to at least one of directly or indirectly communicate.

18. An apparatus according to claim 17, wherein the network comprises at least one of a public network or a private network.

19. A method comprising:
receiving a connection request at an apparatus via a network across which an originating client is configured to communicate;
preparing a network-independent trigger for transmission from the apparatus to a terminal in response to receiving the connection request; and
receiving a registration message, in response to the trigger, at the apparatus from the terminal via the network to thereby register the terminal with the apparatus and acquire a network-dependent identity of the terminal to thereby enable establishment of a communication session with the terminal based upon the network-dependent identity of the terminal.

20. A method according to claim 19, wherein receiving a connection request comprises receiving a connection request at the apparatus from the originating client, the method further comprising preparing the connection request for transmission to the terminal after registering the terminal.

21. A method according to claim 20, wherein preparing the connection request comprises preparing the connection request for transmission from the apparatus to the terminal through at least one other apparatus.

22. A method according to claim 20, wherein receiving a connection request comprises receiving a connection request, and thereafter causing the connection request to be stored in a buffer, and wherein preparing the connection request comprises retrieving the connection request from the buffer and thereafter preparing the connection request for transmission to the terminal based upon the network-dependent identity of the terminal.

23. A method according to claim 19, wherein preparing a trigger for transmission to the terminal comprises preparing a trigger for transmission to the terminal from an apparatus comprising a Session Initiation Protocol (SIP) proxy.

24. A method according to claim 19, wherein receiving a registration message comprises receiving a registration message at the apparatus from the terminal via at least one of a network address translator (NAT) or a firewall (FW) operating between the apparatus and the terminal,
and wherein preparing a network-independent trigger comprises preparing a network-independent trigger for transmission in a manner independent of the at least one of the NAT or FW.

25. A method according to claim 19, wherein receiving a registration message comprises receiving a subsequent registration message, wherein the method further comprises:
receiving a first registration message at the apparatus from the terminal before preparing the network-independent trigger for transmission to thereby register the terminal with the apparatus, wherein the first registration message includes a network-independent identity of the terminal,
and wherein preparing a network-independent trigger comprises preparing a network-independent trigger for transmission based upon the network-independent identity of the terminal.

26. A method according to claim 19, wherein preparing a network-independent trigger comprises preparing a network-independent trigger for transmission to the terminal via a network across which an originating client is configured to at least one of directly or indirectly communicate.

27. A method according to claim 26, wherein the network comprises at least one of a public network or a private network.

28. A method comprising:
receiving a registration message at an apparatus via a network across which an originating client is configured to communicate, wherein receiving a registration message comprises receiving a registration message from a terminal to thereby register the terminal with the apparatus, and wherein the registration message includes a network-independent identity of the terminal; and
preparing a network-independent trigger for transmission to the terminal based upon the network-independent identity of the terminal to thereby trigger the terminal to update registration of the terminal with the apparatus, including acquisition by the apparatus of a network-dependent identity of the terminal to thereby enable establishment of a communication session with the terminal based upon the network-dependent identity of the terminal.

29. A method according to claim 28 further comprising:
receiving a connection request at the apparatus from the originating client, the trigger being prepared for transmission in response to receiving the connection request; and
preparing the connection request for transmission from the apparatus to the terminal after acquiring the network-dependent identity of the terminal.

30. A method according to claim 29, wherein preparing the connection request comprises preparing the connection request for transmission from the apparatus to the terminal through at least one other apparatus.

31. A method according to claim 29, wherein receiving a connection request comprises receiving a connection request, and thereafter causing the connection request to be stored in a buffer, and wherein preparing the connection request comprises retrieving the connection request from the buffer and thereafter preparing the connection request for transmission to the terminal based upon the network-dependent identity of the terminal to thereby enable establishment of the communication session.

32. A method according to claim 28, wherein receiving a registration message at an apparatus comprises receiving a registration message at an apparatus comprising a Session Initiation Protocol (SIP) proxy.

33. A method according to claim 28, wherein receiving a registration message comprises receiving a registration message at an apparatus from the terminal via at least one of a network address translator (NAT) or a firewall (FW) operating between the apparatus and the terminal,
and wherein preparing a network-independent trigger comprises preparing a network-independent trigger for transmission to the terminal in a manner independent of the at least one of the NAT or the FW.

34. A method according to claim 28, wherein receiving a registration message comprises receiving a first registration message, and wherein the method further comprises:
receiving a subsequent registration message at the apparatus from the terminal in response to the trigger being sent to the terminal to thereby update registration of the terminal and acquire the network-dependent identity of the terminal, thereby enabling establishment of a communication session with the terminal based upon the network-dependent identity of the terminal.

35. A method according to claim 28, wherein receiving a registration message comprises receiving a registration message via a network across which an originating client is configured to at least one of directly or indirectly communicate.

36. A method according to claim 35, wherein receiving a registration message comprises receiving a registration message via in a network comprising at least one of a public network or a private network.

37. An apparatus comprising:
a processor; and
a memory including computer program code, the memory and computer program code configured to, with the processor, cause the apparatus to at least:
receive a trigger from another apparatus operating in a network across which an originating client is configured to communicate, the trigger comprising a network-independent trigger; and in response to receipt of the trigger,
prepare a registration message for transmission to the other apparatus via the network to thereby register the apparatus with the other apparatus and acquire a network-dependent identity of the apparatus to thereby enable establishment of a communication session with the apparatus based upon the network-dependent identity of the apparatus.

38. An apparatus according to claim 37, wherein the apparatus being caused to receive a trigger comprises the apparatus being caused to receive a trigger in response to the other apparatus receiving a connection request from the originating client, and wherein the memory and computer program code are further configured to, with the processor, cause the apparatus to further receive the connection request from the other apparatus after registration of the apparatus.

39. An apparatus according to claim 38, wherein the apparatus being caused to receive the connection request comprises the apparatus being caused to receive the connection request from the other apparatus via at least one further apparatus.

40. An apparatus according to claim 38, wherein the apparatus being caused to receive a trigger comprises the apparatus being caused to receive a trigger in response to the other apparatus receiving, and thereafter storing in a buffer, a connection request from the originating client, and wherein the apparatus being caused to prepare a registration message comprises the apparatus being caused to prepare a registration message for transmission to the other apparatus to thereby enable the other apparatus to retrieve the connection request from the buffer and thereafter send the connection request to the apparatus based upon the network-dependent identity of the apparatus.

41. An apparatus according to claim 37, wherein the apparatus being caused to receive a trigger comprises the apparatus being caused to receive a trigger from another apparatus comprising a Session Initiation Protocol (SIP) proxy.

42. An apparatus according to claim 37, wherein the apparatus being caused to prepare a registration message comprises the apparatus being caused to prepare a registration message for transmission to the other apparatus via at least one of a network address translator (NAT) or a firewall (FW) operating between the other apparatus and the apparatus,
    and wherein the apparatus being caused to receive a trigger comprises the apparatus being caused to receive a trigger in a manner independent of the at least one of the NAT or the FW.

43. An apparatus according to claim 37, wherein the apparatus being caused to prepare a registration message comprises the apparatus being caused to prepare a subsequent registration message for transmission, and wherein the memory and computer program code are further configured to, with the processor, cause the apparatus to further:
    prepare a first registration message for transmission to the other apparatus before receipt of the trigger to thereby register the apparatus with the other apparatus, wherein the first registration message includes a network-independent identity of the apparatus to thereby enable the processor to receive the network-independent trigger based upon the network-independent identity of the apparatus.

44. An apparatus according to claim 37, wherein the apparatus being caused to receive a trigger comprises the apparatus being caused to receive a trigger from another apparatus operating in a network across which an originating client is configured to at least one of directly or indirectly communicate.

45. An apparatus according to claim 44, wherein the apparatus being caused to receive a trigger comprises the apparatus being caused to receive a trigger from another apparatus operating in a network comprising at least one of a public network or private network.

46. An apparatus comprising:
a processor; and
a memory including computer program code, the memory and computer program code configured to, with the processor, cause the apparatus to at least:
prepare a registration message for transmission to another apparatus operating in a network across which an originating client is configured to communicate, wherein the apparatus being caused to prepare a registration message comprises the apparatus being caused to prepare a registration message for transmission via the network to thereby register the apparatus with the other apparatus, wherein the registration message includes a network-independent identity of the apparatus; and
receive a network-independent trigger based upon the network-independent identity of the apparatus to thereby trigger the apparatus to update registration of the apparatus with the other apparatus, including acquisition of a network-dependent identity of the apparatus to thereby enable establishment of a communication session with the apparatus based upon the network-dependent identity of the apparatus.

47. An apparatus according to claim 46, wherein the apparatus being caused to receive a network-independent trigger comprises the apparatus being caused to receive a network-independent trigger in response to the other apparatus receiving a connection request from the originating client, and wherein the memory and computer program code are further configured to, with the processor, cause the apparatus to further receive the connection request from the other apparatus after registration of the apparatus with the other apparatus.

48. An apparatus according to claim 47, wherein the apparatus being caused to receive the connection request comprises the apparatus being caused to receive the connection request from the other apparatus node via at least one further apparatus.

49. An apparatus according to claim 47, wherein the apparatus being caused to receive a network-independent trigger comprises the apparatus being caused to receive a network-independent trigger in response to the other apparatus receiving, and thereafter storing in a buffer, the connection request, and wherein the apparatus being caused to receive the connection request comprises the apparatus being caused to receive the connection request from the other apparatus, the other apparatus having retrieved the connection request from the buffer and thereafter sent the connection request to the apparatus based upon the network-dependent identity of the apparatus.

50. An apparatus according to claim 46, wherein the apparatus being caused to prepare a registration message comprises the apparatus being caused to prepare a registration message for transmission to another apparatus comprising a Session Initiation Protocol (SIP) proxy.

51. An apparatus according to claim 46, wherein the apparatus being caused to prepare a registration message comprises the apparatus being caused to prepare a registration message for transmission to another apparatus via at least one of a network address translator (NAT) or a firewall (FW) operating between the other apparatus and the apparatus,
    and wherein the apparatus being caused to receive a network-independent trigger comprises the apparatus being caused to receive a network-independent trigger in a manner independent of the at least one of the NAT or the FW.

52. An apparatus according to claim 46, wherein the apparatus being caused to prepare a registration message comprises the apparatus being caused to prepare a first registration message for transmission to another apparatus to thereby register the apparatus with the other apparatus, and wherein the memory and computer program code are further configured to, with the processor, cause the apparatus to further prepare a subsequent registration message for transmission to the other apparatus in response to receipt of the trigger to thereby update registration of the apparatus and acquire the network-dependent identity of the apparatus to thereby enable establishment of a communication session with the apparatus based upon the network-dependent identity of the apparatus.

53. An apparatus according to claim 46, wherein the apparatus being caused to prepare a registration message comprises the apparatus being caused to prepare a registration message for transmission to another apparatus operating in a network across which an originating client is configured to at least one of directly or indirectly communicate.

54. An apparatus according to claim 46, wherein the apparatus being caused to prepare a registration message comprises the apparatus being caused to prepare a registration message for transmission to another apparatus operating in a network comprising at least one of a public network or a private network.

* * * * *